United States Patent
Cassagne et al.

(10) Patent No.: US 12,377,996 B2
(45) Date of Patent: Aug. 5, 2025

(54) PROPELLER PROPULSION SYSTEM WITH T-SHAPED CHASSIS

(71) Applicant: Airbus Operations SAS, Toulouse (FR)

(72) Inventors: Jérôme Cassagne, Toulouse (FR);
Frédéric Vinches, Toulouse (FR);
Lionel Czapla, Toulouse (FR); Kotaro Fukasaku, Toulouse (FR); Rémi Amargier, Toulouse (FR)

(73) Assignee: AIRBUS OPERATIONS SAS, Toulouse (FR)

(*) Notice: Subject to any disclaimer, the term of this patent is extended or adjusted under 35 U.S.C. 154(b) by 0 days.

(21) Appl. No.: 18/519,467

(22) Filed: Nov. 27, 2023

(65) Prior Publication Data

US 2024/0174368 A1    May 30, 2024

(30) Foreign Application Priority Data

Nov. 30, 2022 (FR) ................................. 2212579

(51) Int. Cl.
*B64D 27/40* (2024.01)
*B64D 27/31* (2024.01)
*B64D 27/355* (2024.01)

(52) U.S. Cl.
CPC ............ *B64D 27/40* (2024.01); *B64D 27/31* (2024.01); *B64D 27/355* (2024.01)

(58) Field of Classification Search
CPC ...... B64D 27/40; B64D 27/31; B64D 27/402; B64D 29/00; B64D 29/02
See application file for complete search history.

(56) References Cited

U.S. PATENT DOCUMENTS

| | | | |
|---|---|---|---|
| 5,106,035 | A | 4/1992 | Langford, III |
| 11,420,757 | B2 | 8/2022 | Clarke et al. |
| 2011/0174919 | A1 | 7/2011 | Caruel et al. |
| 2021/0078719 | A1 | 3/2021 | Thomas et al. |
| 2022/0219826 | A1 | 7/2022 | Knoll et al. |
| 2022/0355942 | A1 | 11/2022 | Pome et al. |
| 2022/0371743 | A1 | 11/2022 | Allain et al. |
| 2023/0415906 | A1* | 12/2023 | Fukasaku .............. B64D 27/24 |
| 2024/0017843 | A1* | 1/2024 | Amargier .............. B64D 27/24 |

OTHER PUBLICATIONS

French Search Report for corresponding French Patent Application No. 2212579 dated May 23, 2023; priority document.

* cited by examiner

*Primary Examiner* — Arfan Y. Sinaki
(74) *Attorney, Agent, or Firm* — Greer, Burns & Crain, Ltd.

(57) ABSTRACT

A propulsion assembly for an aircraft, having a T-shaped chassis with a horizontal structure and a vertical structure, a gearbox fastened to a front of the chassis, and a propulsion system having the following propulsion elements: an electric motor driving the components of the gearbox, a fuel cell, a tank and a cooling system, wherein the propulsion elements are fastened beneath the horizontal structure and against the vertical structure by fastening means.

11 Claims, 8 Drawing Sheets

PROPELLER PROPULSION SYSTEM WITH T-SHAPED CHASSIS

CROSS-REFERENCES TO RELATED APPLICATIONS

This application claims the benefit of the French patent application No. 2212579 filed on Nov. 30, 2022, the entire disclosures of which are incorporated herein by way of reference.

FIELD OF THE INVENTION

The present invention relates to a propeller propulsion assembly for an aircraft, the propulsion assembly comprising a T-shaped chassis fastened to a structure of a wing of the aircraft and a propulsion system constituted of a plurality of pieces of equipment fastened to the T-shaped chassis. The invention also relates to an aircraft having at least one such propulsion assembly.

BACKGROUND OF THE INVENTION

In order to move, an aircraft conventionally has at least one propulsion assembly comprising a propulsion system arranged in a nacelle. The propulsion system has a chassis, a motor fastened to the chassis, and a propeller driven in rotation by the motor. The chassis of the nacelle is fastened beneath a pylon that is itself fastened beneath a structure of the wing of the aircraft.

The propulsion system, and more particularly the motor, has numerous elements that are fastened either to the pylon or to the chassis, and these elements are generally nested in a complex manner inside the chassis, which has external reinforcing bars that are around the elements and make it difficult to access the elements.

During operations for maintenance of the propulsion assembly, the removal of the elements can be complex as a result of the presence of the reinforcing bars.

SUMMARY OF THE INVENTION

An object of the present invention is to propose a propulsion assembly that allows easy access to the elements constituting the propulsion system.

To that end, a propulsion assembly for an aircraft is proposed, having a longitudinal direction and having:
- a chassis having a T-shaped profile with a horizontal structure and a vertical structure,
- a gearbox comprising an output shaft, the output shaft bearing a propeller, the gearbox being fastened to the front of the chassis by first fastening means, and
- a propulsion system having at least the following propulsion elements: at least one electric motor, each of the at least one electric motor having a drive shaft mechanically coupled to the gearbox, at least one fuel cell configured to electrically power the at least one electric motor, and at least one tank configured to supply the at least one fuel cell with dihydrogen, wherein the propulsion elements are fastened beneath the horizontal structure and against the vertical structure by second fastening means.

With such an arrangement, it is easy to access each propulsion element via the side of the chassis during maintenance operations.

Advantageously, there is a single tank fastened beneath the horizontal structure at a rear end thereof.

Advantageously, there is one first fastening means fastened between the gearbox and a bottom end of the vertical structure and, on either side of the vertical structure, one first fastening means fastened between the gearbox and the horizontal structure.

Advantageously, the propulsion assembly has lateral fastening points as one with an upper surface of the horizontal structure and intended to fasten the horizontal structure to a structure of a wing of the aircraft, a port rod and a starboard rod, wherein the rods are arranged vertically in line with the lateral fastening points, wherein the port rod is fastened between a port end of the horizontal structure at a lower surface of the horizontal structure and a port lateral surface of the vertical structure and wherein the starboard rod is fastened between a starboard end of the horizontal structure at a lower surface of the horizontal structure and a starboard lateral surface of the vertical structure.

Advantageously, the propulsion assembly has, on either side of the chassis, at least one lateral cowl mounted so as to be able to move in rotation on the horizontal structure about a pivot axis and, for each lateral cowl, the propulsion assembly has hinges, of which a fixed part is as one with the horizontal structure and a mobile part as one with the lateral cowl.

Advantageously, the propulsion assembly has, on either side of the vertical structure, arches that are distributed along the port and starboard edges of the horizontal structure, wherein each one has a first end fastened to the port or starboard edge of the horizontal structure and a second end fastened to a bottom end of the vertical structure at a port or starboard lateral surface of the vertical structure.

Advantageously, certain arches are disposed so as to be between two propulsion elements parallel to the port or starboard edge of the horizontal structure, and a fire break wall is put in place inside the certain arches.

According to one particular embodiment, the propulsion assembly has an upper cowl fastened to the chassis between the lateral cowls.

Advantageously, the propulsion assembly has a floor fastened at a bottom end of the vertical structure, parallel to the horizontal structure and opposite the latter with respect to the vertical structure.

Advantageously, the propulsion assembly has four fastening points distributed in pairs on the port side and on the starboard side and one in front of the other for each pair, each fastening point taking the form of a shackle, wherein each shackle corresponding to a front fastening point is mounted articulated by one front articulation point of the horizontal structure and intended to be mounted articulated by one front articulation point to the structure of the wing, wherein each front articulation point consists of a rotation about an axis of rotation parallel to the longitudinal direction, wherein each shackle corresponding to a rear fastening point is mounted articulated by two rear articulation points of the horizontal structure and intended to be mounted articulated by one rear articulation point to the structure of the wing and wherein each rear articulation point consists of a rotation about a horizontal axis of rotation having a non-zero angle with the longitudinal direction.

The invention also proposes an aircraft having at least one propulsion assembly according to one of the preceding variants.

BRIEF DESCRIPTION OF THE DRAWINGS

The abovementioned features of the invention, along with others, will become more clearly apparent upon reading the following description of one exemplary embodiment, the description being given with reference to the appended drawings, in which.

DETAILED DESCRIPTION OF THE PREFERRED EMBODIMENTS

Figure 1:
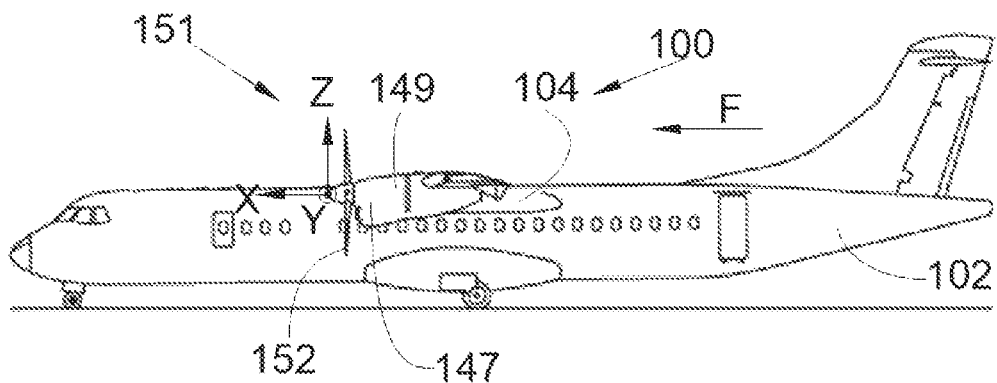
FIG. 1 is a side view of an aircraft having a propulsion assembly according to the invention.

In the following description, terms relating to a position are considered in relation to an aircraft in a position of forward movement, i.e., as shown in FIG. 1 in which the arrow F shows the direction of forward movement of the aircraft.

FIG. 1 shows an aircraft 100 that has a fuselage 102, on either side of which is fastened a wing 104. Beneath each wing 104 is fastened at least one propulsion assembly 151 that has a nacelle 149 constituted of cowls 147 forming an aerodynamic outer surface.

The propulsion assembly 151 has a propulsion system housed inside the nacelle 149 and a propeller 152.

In the following description, and by convention, X denotes the longitudinal direction, which corresponds to the axis of rotation of the propeller 152 oriented positively towards the front in the direction of forward movement of the aircraft, Y denotes the transverse direction, which is horizontal when the aircraft is on the ground, and Z denotes the vertical direction or vertical height when the aircraft is on the ground, these three directions X, Y and Z being mutually orthogonal.

Figure 2:
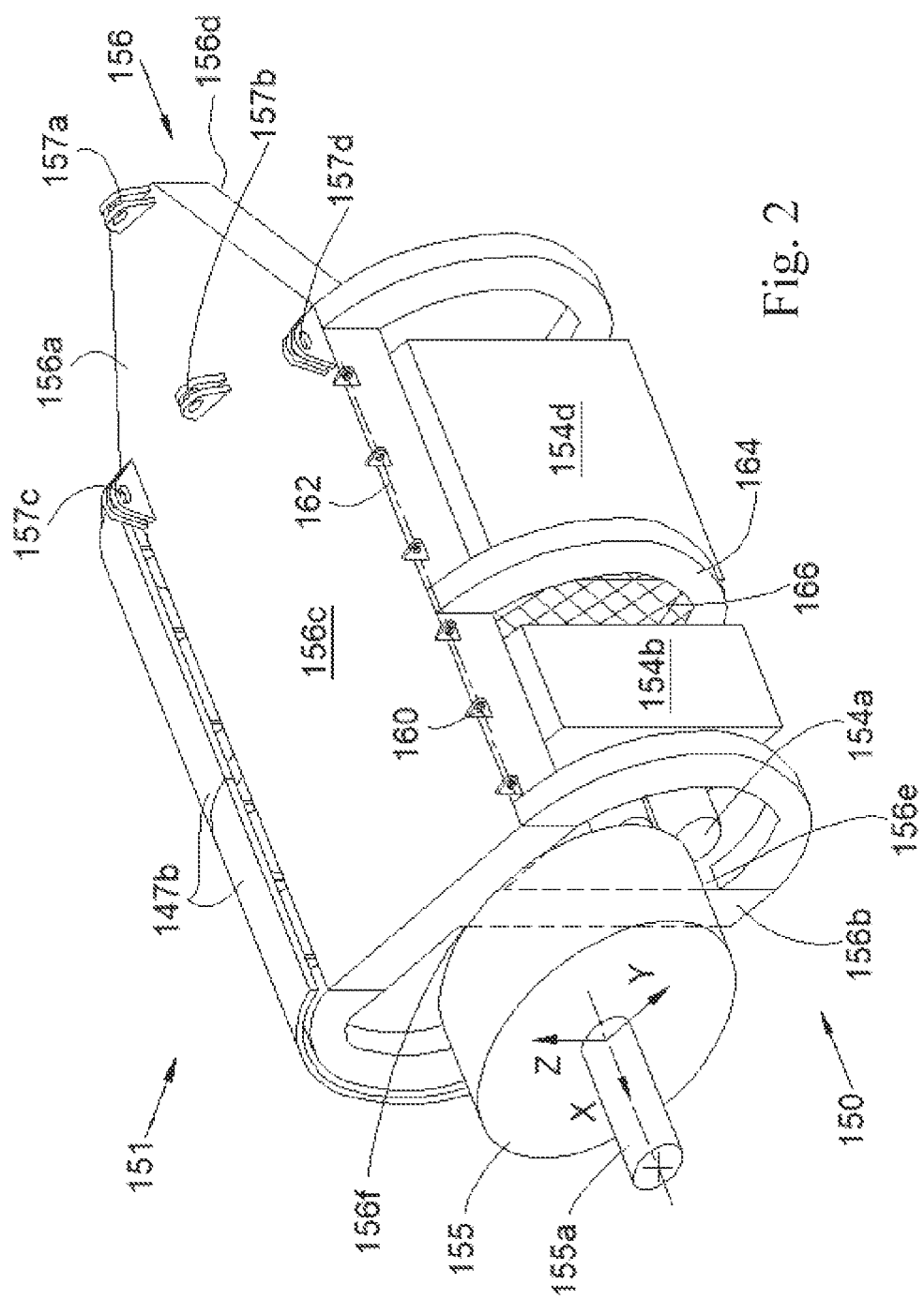
FIG. 2 is a perspective view of a propulsion assembly according to the invention.

FIG. 2 shows the propulsion assembly 151 without the nacelle 149 and without the propeller 152 and that also has the propulsion system 150. The propulsion assembly 151 has a longitudinal direction parallel to the longitudinal direction X, a transverse direction parallel to the transverse direction Y and a vertical direction parallel to the vertical direction Z.

Figure 3:
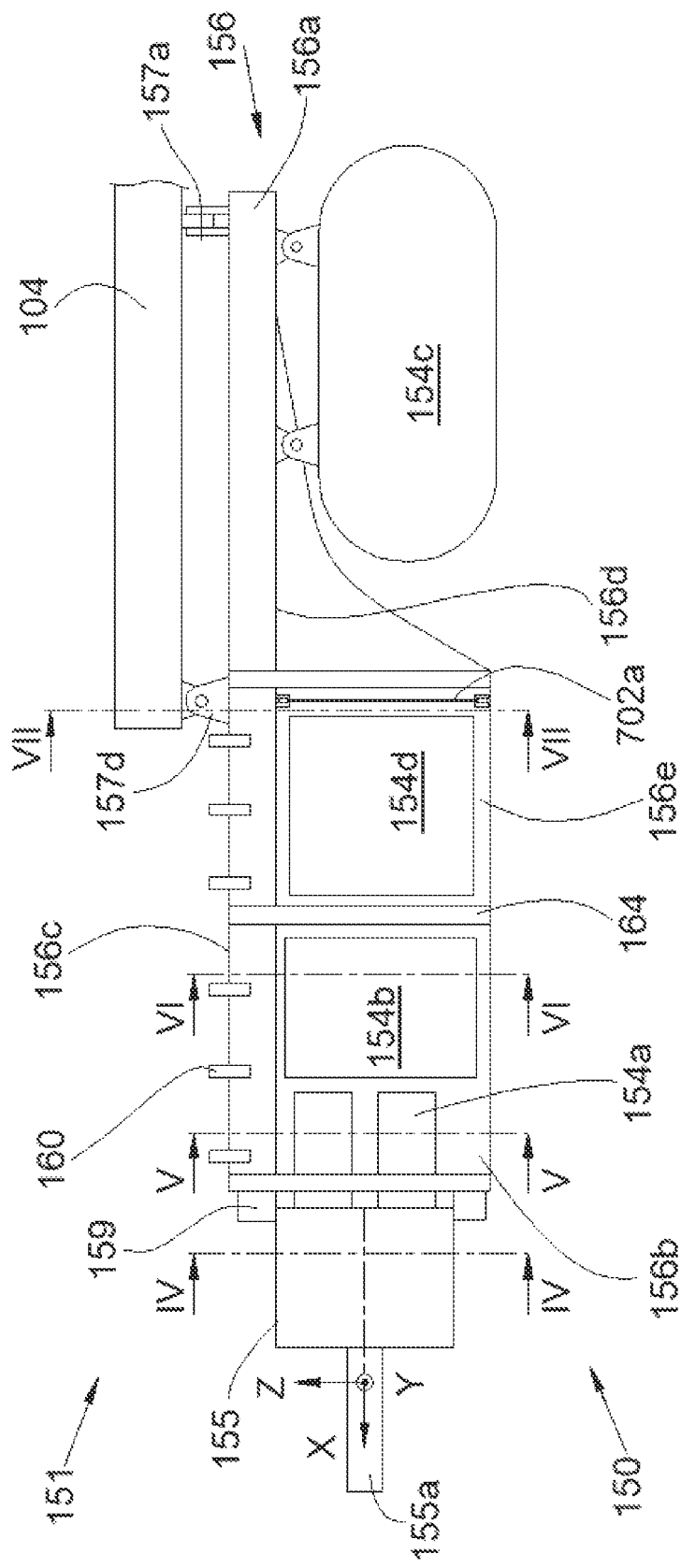
FIG. 3 is a side view of the propulsion assembly according to the invention.

FIG. 3 shows the propulsion assembly 151 in side view.

The propulsion assembly 151 has a gearbox 155 of which the output shaft 155a bears the propeller 152.

The propulsion system 150 has at least one electric motor 154a wherein each of the at least one electric motor 154a comprises a drive shaft mechanically coupled to the gearbox 155 so as to drive the components (gears) of the gearbox 155 and thus make the output shaft 155a of the gearbox 155 and the propeller 152 rotate.

The propulsion assembly 151 also has a chassis 156 that has a T-shaped profile extending parallel to the longitudinal direction X and having a horizontal structure 156a, such as a plate, and a vertical structure 156b, such as a wall, which is disposed beneath the horizontal structure 156a in a generally centered manner. The horizontal structure 156a is generally parallel to a horizontal plane XY and the vertical structure 156b is generally parallel to a vertical plane XZ.

The horizontal structure 156a constitutes a pylon fastened to a structure of the wing 104 by fastening points 157a-d as one with an upper surface 156c of the horizontal structure 156a and which are, in this case, four in number. There is one rear fastening point 157a that is disposed at the rear of the horizontal structure 156a and compensates for the forces in the Z direction. There is one front fastening point 157b that is in front of the rear fastening point 157a and that compensates for the forces in the Y direction. There are two lateral fastening points 157c-d disposed on either side of the front fastening point 157b and each one compensates for the forces in the X direction and the Z direction. These various fastening points take any form known to those skilled in the art. In the embodiment of the invention that is presented here, each fastening point 157a-d comprises a female clevis as one with the horizontal structure 156a and a male clevis as one with the structure of the wing 104 and mounted articulated in the female clevis. The rear fastening point 157a and the front fastening point 157b are aligned on a vertical median plane XZ of the horizontal structure 156a and the lateral fastening points 157c-d are disposed symmetrically on either side of the vertical median plane XZ.

In the case of an aircraft 100 using fuel cells, the propulsion system 150 also has 154b fuel cells, and at least one tank 154c containing dihydrogen so as to supply each of the fuel cells 154b in order to produce electricity to power the one or more electric motors 154a. Depending on the circumstances, the propulsion system 150 may have other elements such as, for example, a cooling system 154d of the air supply systems, etc.

The propulsion system 150 thus has, in the embodiment presented here, from the front to the rear, at least the following propulsion elements: the electric motors 154a, the fuel cells 154b, the cooling system 154d and the tank 154c.

Conventionally, each fuel cell 154b is supplied with air and dihydrogen from the tank 154c so as to generate electricity that powers at least one electric motor 154a. The cooling system 154d is designed to cool the various elements of the propulsion system 150. These various elements 154a-d are known to those skilled in the art and are not described in greater detail. The various cables, ducts, etc. that connect the various elements 154a-d to each other are not shown.

These various propulsion elements 154a-c are fastened beneath the horizontal structure 156a at a lower surface 156d and against the vertical structure 156b by fastening means, called second fastening means, at port 156e or starboard 156f lateral surfaces. As a result of the T shape of the chassis 156, the elements 154a-c can be distributed on either side of the vertical structure 156b. The second fastening means may take various forms. It can be a clevis system, a screw-nut system or any other system. In the embodiment of the invention that is presented here, the cooling system 154d is also fastened beneath the horizontal structure 156a at a lower surface 156d and against the vertical structure 156b by second fastening means.

Access to the elements 154a-d is thus made easier because there is no structural element on the sides and a maintenance agent can thus quickly access the various propulsion elements 154a-d via the side of the chassis 156.

Figure 10:
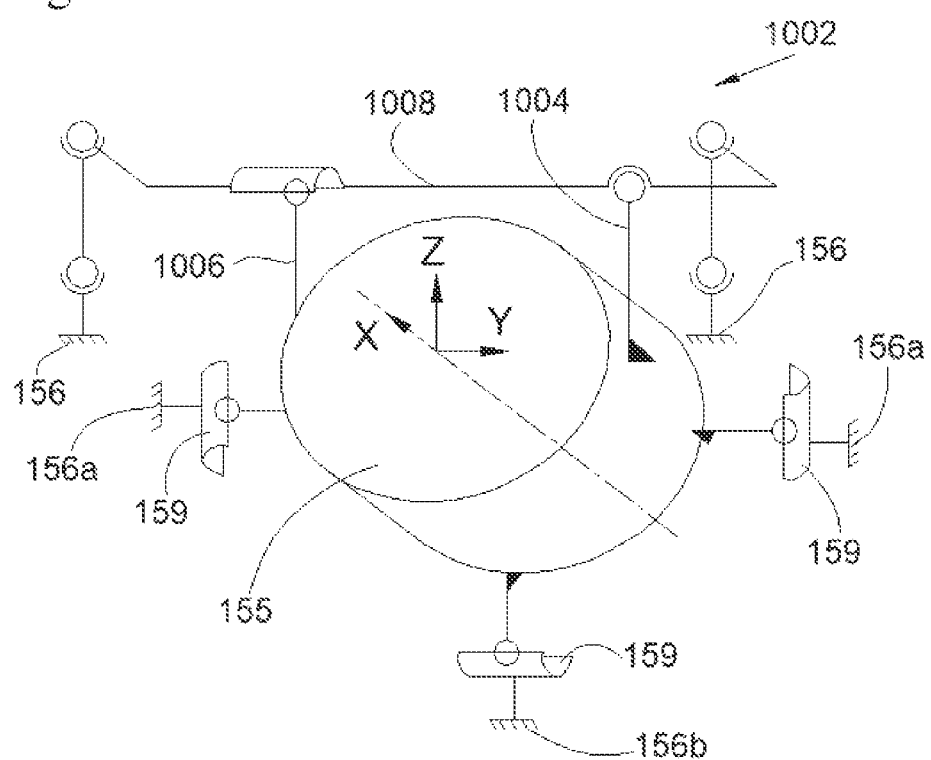
FIG. 10 is a schematic depiction of a method of installation of a gearbox of the propulsion assembly.

The gearbox 155 is fastened to the front of the chassis 156 by first fastening means 159, one embodiment of which is shown in FIG. 10, which is described below.

In the embodiment of the invention that is presented in FIG. 3, there is a single tank 154c that is fastened to the lower surface 156d beneath the horizontal structure 156a at a rear end thereof. In order to allow the tank 154c to be put in place in the middle of the horizontal structure 156a, the vertical structure 156b is reduced at the location of the tank 154c. The tank 154c is fastened to the horizontal structure 156a in this case by clevis systems.

Figure 4:
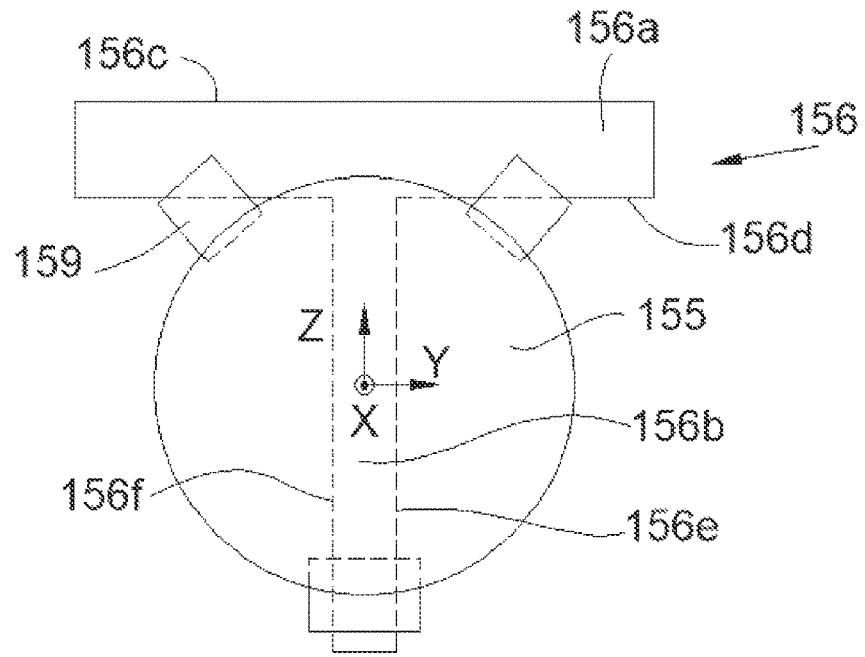
FIG. 4 is a view in cross section of the propulsion assembly in FIG. 3 along the line IV-IV.

FIG. 4 shows the cross section at the gearbox 155, which is fastened by three first fastening means 159 intended to limit the transfer of the vibrations due to the movements of the propeller 152 to the chassis 156. In this case, there is one first fastening means 159 fastened between the gearbox 155 and a bottom end of the vertical structure 156b and, on either side of the vertical structure 156b, one first fastening means 159 fastened between the gearbox 155 and the horizontal structure 156a.

Each first fastening means 159 is, for example, of the Silentbloc® type, i.e., it has a core made of flexible material such as rubber and two threaded rods as one with the core, one of which is fastened to the gearbox 155 and the other of which is fastened to the horizontal structure 156a or to the vertical structure 156b.

This T-shaped chassis 156 also offers an advantage for an installation of three attachments of the gearbox 155 (in this case the first fastening means 159) which are flexible or rigid in order to ensure direct transmission of the forces from the gearbox 155 to the chassis 156.

Figure 5:
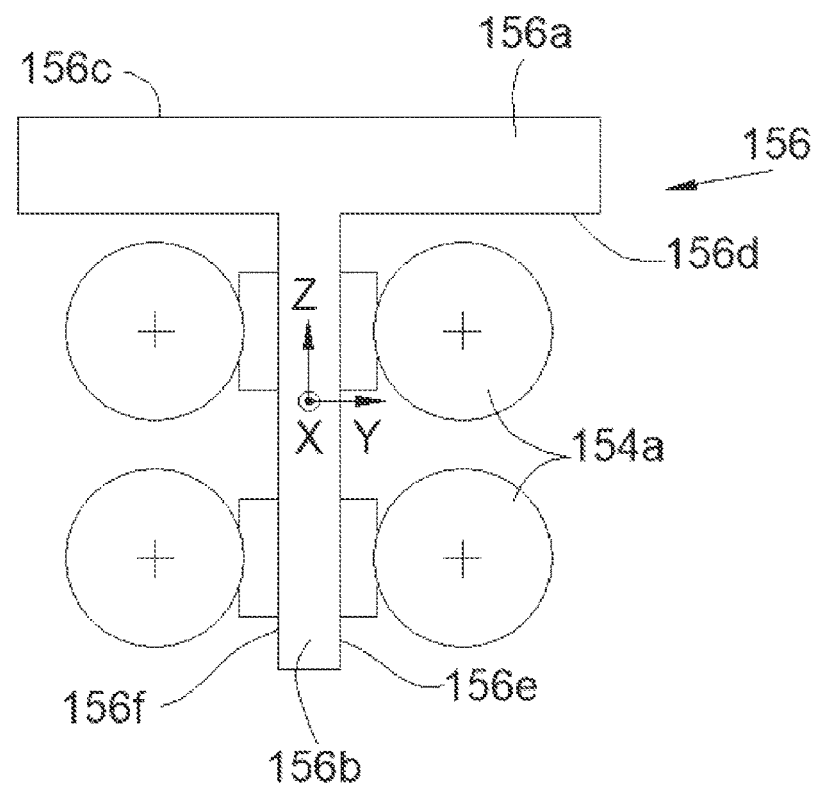
FIG. 5 is a view in cross section of the propulsion assembly in FIG. 3 along the line V-V.

FIG. 5 shows the cross section at the electric motors 154a. In the embodiment of the invention that is presented here, there are four electric motors 154a and they are fastened in pairs on either side of the vertical structure 156b against the port 156e and starboard 156f lateral surfaces.

Figure 6:
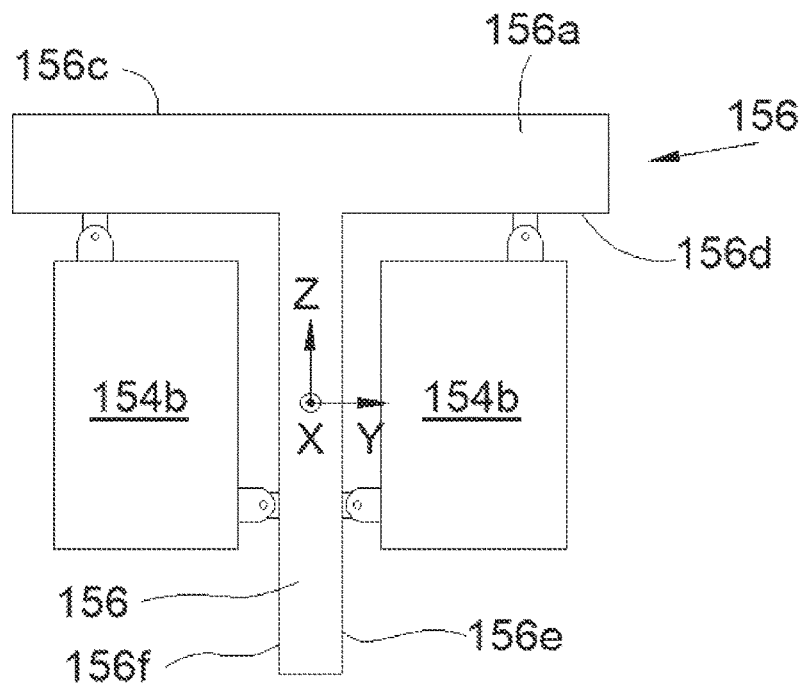
FIG. 6 is a view in cross section of the propulsion assembly in FIG. 3 along the line VI-VI.

FIG. 6 shows the cross section at the fuel cells 154b. In the embodiment of the invention that is presented here, there are two fuel cells 154b, which are fastened on either side of the vertical structure 156b against the port 156e and starboard 156f lateral surfaces and to the lower surface 156d.

Figure 7:
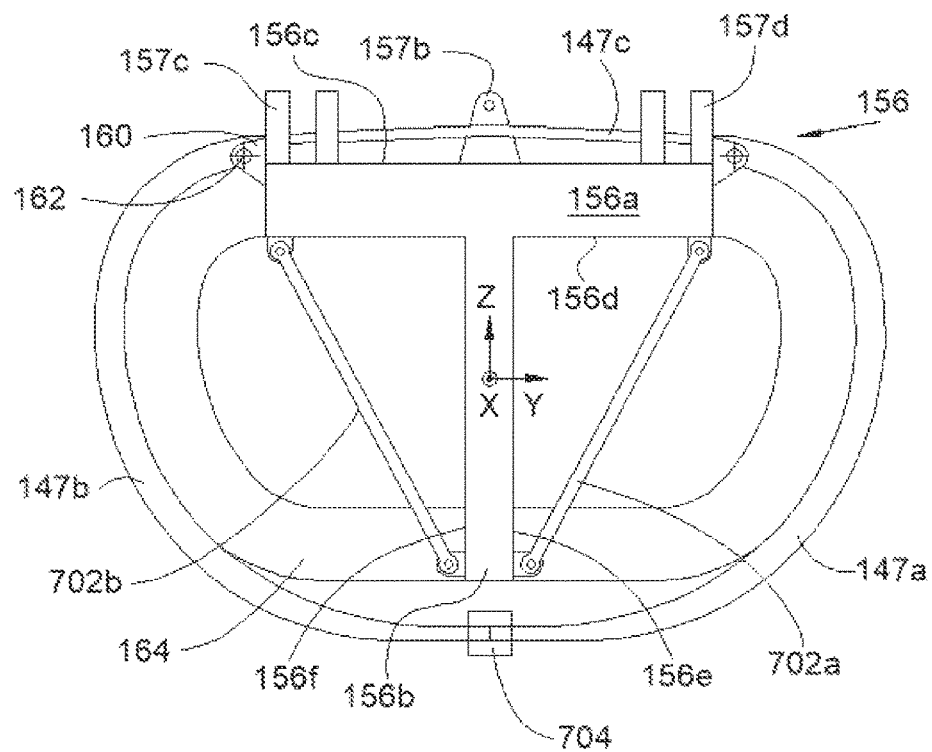
FIG. 7 is a view in cross section of the propulsion assembly in FIG. 3 along the line VII-VII.

FIG. 7 shows the cross section at the lateral fastening points 157c-d. The propulsion system 150 has, on either side of the vertical structure 156b, a rod 702a-b. There is thus one port rod 702a and one starboard rod 702b.

Each rod 702a-b is arranged in a vertical plane YZ, i.e., a plane perpendicular to the longitudinal direction X and vertically in line with the lateral fastening points 157c-d.

Each rod 702a-b has a first end fastened to the lower surface 156d of the horizontal structure 156a at the lateral end of the horizontal structure 156a and a second end fastened to a lateral surface of the vertical structure 156b, in this case at a bottom end of the vertical structure 156b. The lower surface 156d is the face opposite the upper surface 156c of the horizontal structure 156a bearing the fastening points 157a-d.

The port rod 702a is thus fastened between the port end of the horizontal structure 156a and the port lateral surface 156e of the vertical structure 156b and the starboard rod 702b is thus fastened between the starboard end of the horizontal structure 156a and the starboard lateral surface 156f of the vertical structure 156b.

Each fastening of one end of a connecting rod 702a-b is provided in this case by a clevis system.

The rods 702a-b react the vertical forces.

Similar rods can also be put in place towards the front with respect to the lateral fastening points 157c-d, i.e., in this case, at the fuel cells 154b and the electric motors 154a.

On either side of the chassis 156, the nacelle 149 has lateral cowls 147a-b and each lateral cowl 147a-b is mounted so as to be able to move in rotation on the horizontal structure 156a about a pivot axis 162 that is generally parallel to the longitudinal direction X. In the embodiment of the invention that is presented in FIG. 2, on each side of the horizontal structure 156a, there is a front cowl and a rear cowl disposed one behind the other parallel to the longitudinal direction X.

Each lateral cowl 147a-b is able to move between a closed position in which the lateral cowls 147a-b are lowered so that the chassis 156 and the propulsion system 150 are enclosed between the lateral cowls 147a-b and an open position in which the lateral cowls 147a-b are raised so that the chassis 156 and the propulsion system 150 are accessible from the sides.

In order to create the pivot connection around the pivot axis 162, hinges are disposed along the port and starboard edges of the horizontal structure 156a, wherein each hinge has a fixed part 160 as one with a port or starboard edge of the horizontal structure 156a and a mobile part as one with the lateral cowl 147a-b. The two parts 160 are conventionally secured by a pin that passes through them both. The port and starboard edges of the horizontal structure 156a are generally parallel to the longitudinal direction X.

Conventionally, in order to lock the lateral cowls 147a-b, locks 704 are provided so as to lock, at 6 o'clock, the free ends of the lateral cowls 147a-b to each other.

In the embodiment of the invention that is presented in FIG. 7, the nacelle 149 also has an upper cowl 147c that is fastened to the chassis 156 between the lateral cowls 147a-b. The upper cowl 147c is fastened by any appropriate means such as screws, rivets, etc.

In order to augment the aerodynamics of the propulsion assembly 151, the nacelle 149 may have other cowls fastened to the chassis 156.

In the embodiment of the invention that is presented in FIGS. 2, 3 and 7, the propulsion assembly 151 has, on either side of the vertical structure 156b, arches 164, in this case three of them per side, which are distributed along the port and starboard edges of the horizontal structure 156a, wherein each one has a first end fastened to the port or starboard edge of the horizontal structure 156a and a second end fastened to a bottom end of the vertical structure 156b at the port 156e or starboard 156f lateral surface of the vertical structure 156b.

In the embodiment of the invention that is presented in FIGS. 2, 3 and 7, each first end of an arch 164 is fastened against the lateral flank of the horizontal structure 156a, but in another embodiment it can be fastened at the lower surface 156d.

These arches 164 are, in this case, of arcuate shape but they may take a different shape, for example a rectangular shape.

These arches 164 can be put in place to provide structural reinforcement, but they serve mainly as support and holding elements for the lateral cowls 147a-b when they are in the closed position. The lateral cowls 147a-b thus come to bear against the arches 164 in the closed position.

Certain arches 164 may be disposed so as to be between two propulsion elements 154a-d parallel to the port or starboard edge of the horizontal structure 156a, such as, for example, in this case, between the fuel cells 154b and the cooling system 154d and between the cooling system 154d and the tank 154c. This type of architecture with vertical, horizontal and axial structures offers numerous possibilities for segregating zones separated by fire break zones.

Fire break walls 166 can be put in place inside the arches 164 so as to limit the progression of any fire between the two propulsion elements 154a-d disposed on either side of the arch 164.

Figure 8:
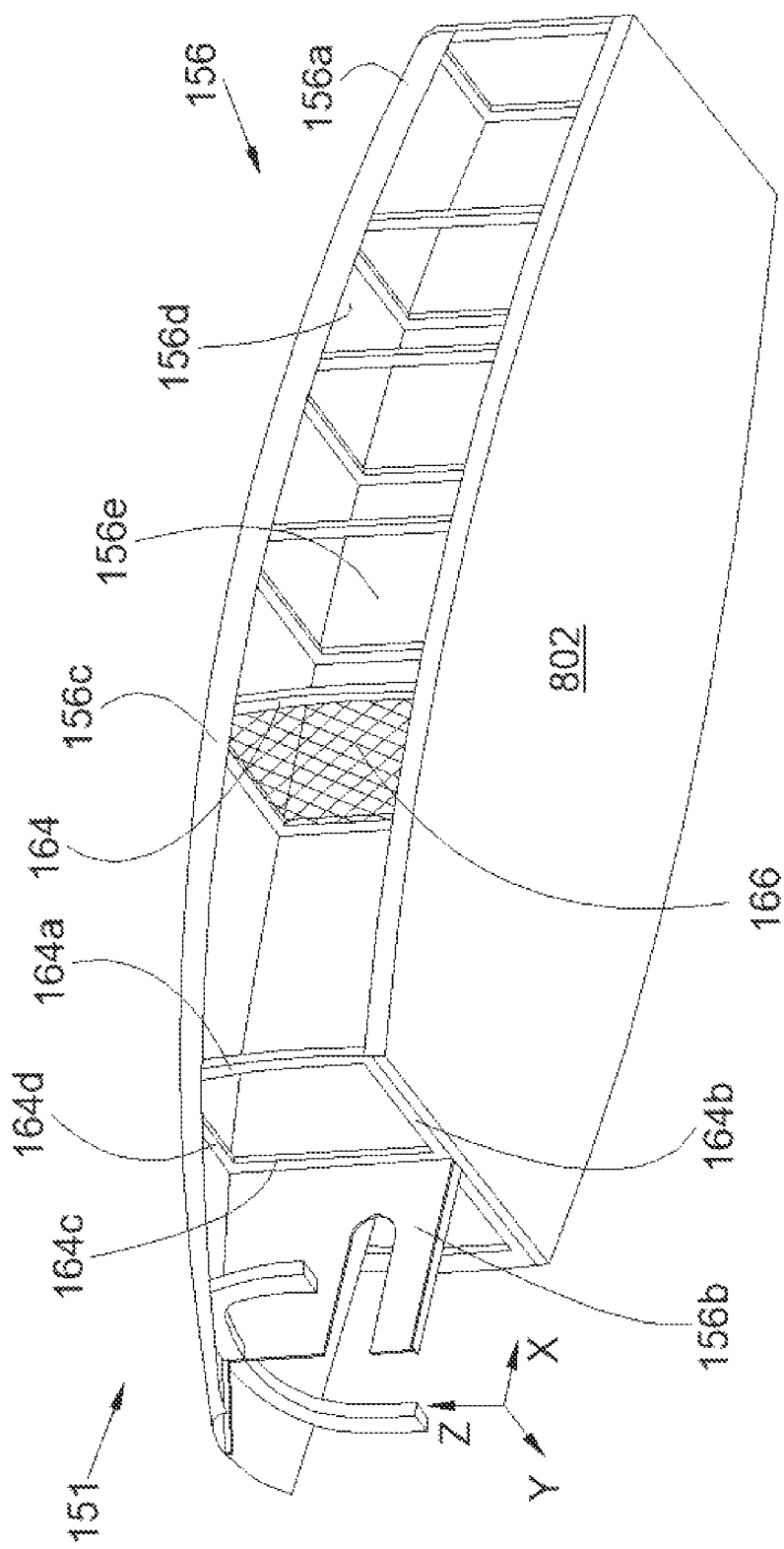
FIG. 8 is a perspective view of a propulsion assembly according to a variant embodiment of the invention.
Figure 9:
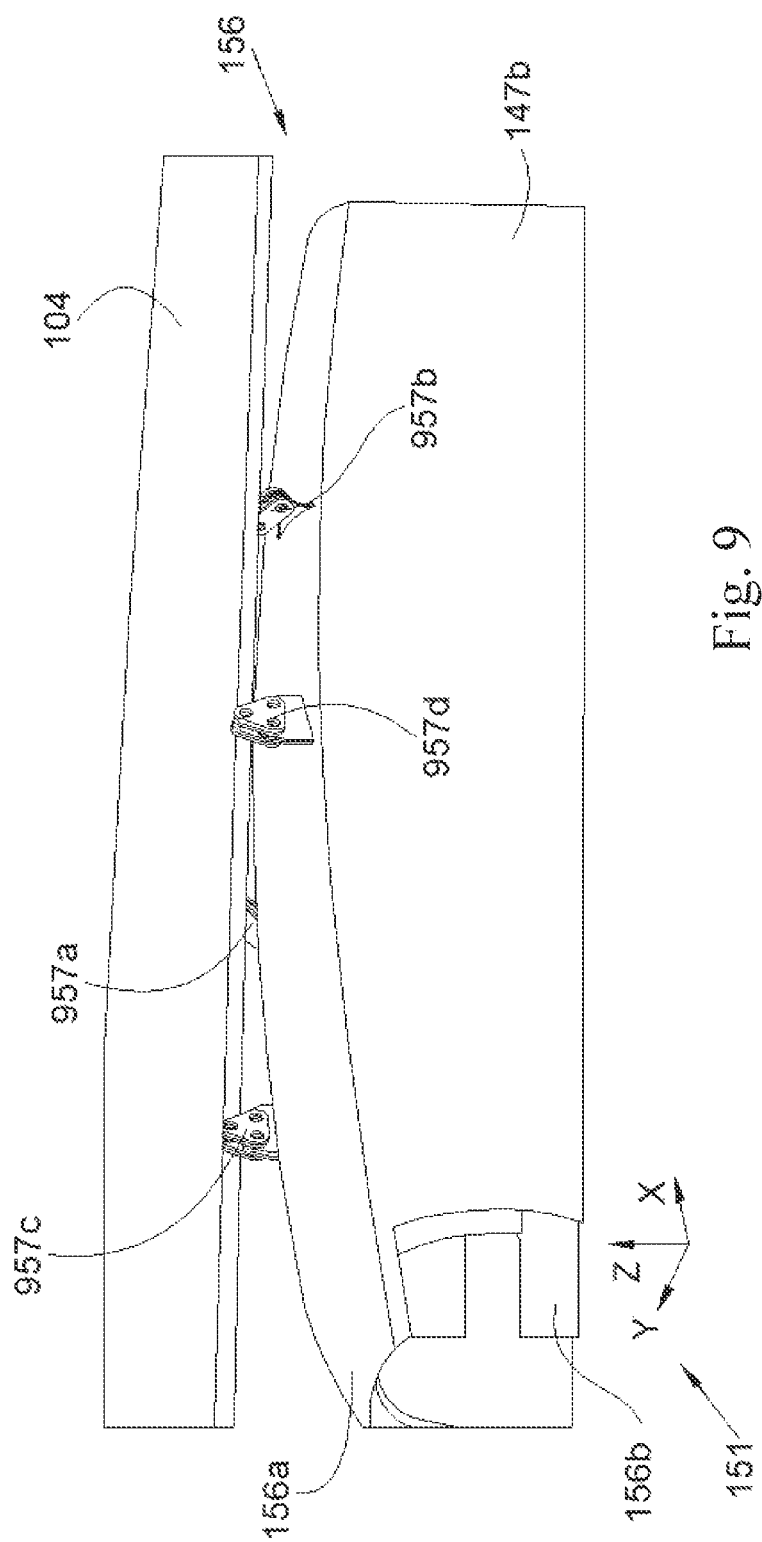
FIG. 9 is a side view of the propulsion assembly in FIG. 8.

In the variant embodiment presented in FIGS. 8 and 9, the upper face 156c of the horizontal structure 156b has an aerodynamic shape, and this makes it possible to dispense with putting the upper cowl 147c in place, resulting in a weight saving.

In the embodiment of the variant, the arches 164 are L-shaped with a vertical leg 164a fastened by a first port or starboard edge end of the horizontal structure 156a at the lower surface 156d and a horizontal leg 164b fastened by a second end to a bottom end of the vertical structure 156b at the port 156e or starboard 156f lateral surface of the vertical structure 156b. The vertical leg 164a and the horizontal leg 164b are secured at their other two ends.

In the embodiment of the invention that is presented in FIG. 8, each arch 164 is supplemented by another vertical leg 164c and another horizontal leg 164d so as to form a frame, wherein the other vertical leg 164c is as one with the port 156e or starboard 156f lateral surface of the vertical structure 156b and wherein the other horizontal leg 164d is as one with the lower surface 156d of the horizontal structure 156a.

A fire break wall 166 may also be put in place in certain arches 164.

The propulsion assembly 151 also has a floor 802 that is horizontal and that is fastened at the bottom end of the vertical structure 156b, i.e., parallel to the horizontal structure 156a and opposite the latter with respect to the vertical structure 156b.

Such a floor 802 also makes it possible to put in place propulsion elements of the propulsion system 150.

In the embodiment of the variant that is presented in FIG. 8, the floor 802 is fastened to the horizontal legs 164b.

In the embodiment of the variant that is presented in FIG. 9, the horizontal structure 156a is fastened to the structure of the wing 104 by four fastening points 957a-d distributed in pairs on the port side and on the starboard side, and one in front of the other for each pair in the longitudinal direction X, namely two front fastening points 957a-b (port and starboard) and two rear fastening points 957c-d (port and starboard) that are disposed in the vicinity of the rear of the horizontal structure 156a or towards the middle of the horizontal structure 156a.

Each fastening point 957a-d takes the form of a shackle fastened by one articulation point to the structure of the wing 104 and by one or two articulation points to the horizontal structure 156a.

Each shackle corresponding to a front fastening point 957a-b is mounted articulated by one front articulation point to the horizontal structure 156a and by one front articulation point to the structure of the wing 104, and each front articulation point consists of a rotation about an axis of rotation parallel to the longitudinal direction X, i.e., each shackle is inscribed in a plane perpendicular to the longitudinal direction X. The front fastening points 957a-b compensate for the forces in the Y direction and the Z direction.

Each shackle corresponding to a rear fastening point 957c-d is mounted articulated by two rear articulation points to the horizontal structure 156a and by one rear articulation point to the structure of the wing 104, and each rear articulation point consists of a rotation about a horizontal axis of rotation having a non-zero angle with the longitudinal direction X, i.e., each shackle is inscribed in a vertical plane that is oblique with respect to the longitudinal direction X. The rear fastening points 957c-d compensate for the forces in the X direction and the Z direction. The angle is between 30° and 60°, i.e., the shackles are inclined from the outside towards the inside going from the rear towards the front.

This particular orientation makes it possible to take advantage of the lever arm of the horizontal structure 156a, while at the same time retaining an isostatic system. This particular orientation is described more particularly in the context of the variant, but it can also be applied to the embodiment in FIGS. 2 and 3, and in this case the lateral fastening points are constituted by the front fastening points 957a-b.

FIG. 10 shows a particular embodiment for fastening the gearbox 155 to the chassis 156. It shows the first three fastening means 159 between the gearbox 155 and, on the one hand, a bottom end of the vertical structure 156b and, on the other hand, the horizontal structure 156a. Each first fastening means 159 creates a sphere-cylinder connection.

In this embodiment, the propulsion assembly 151 also has a reaction system 1002 reacting the moments generated by the electric motors 154a on the gearbox 155.

The force reaction system 1002 has, on the port side, a generally vertical port bar 1004 of which a first end is as one with the gearbox 155, and a generally vertical starboard bar 1006 of which a first end is as one with the gearbox 155.

The force reaction system 1002 has a main bar 1008 oriented parallel to the transverse direction Y, wherein the second end of the port bar 1004 is connected to the main bar 1008 by a sphere-cylinder connection and wherein the second end of the starboard bar 1006 is connected to the main bar 1008 by a ball joint connection.

Each end of the main bar 1008 is secured to the chassis 156 via two ball joint connections in series.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion assembly for an aircraft, having a longitudinal direction and having:
   a chassis having a T-shaped profile with a horizontal structure and a vertical structure,
   a gearbox comprising an output shaft, said output shaft bearing a propeller, the gearbox being fastened to a front of the chassis by first fastening means, and
   a propulsion system having propulsion elements comprising:
      at least one electric motor,
      the at least one electric motor having a drive shaft mechanically coupled to the gearbox,
      at least one fuel cell configured to electrically power said at least one electric motor, and wherein the at least one electric motor and the at least one fuel cell are fastened beneath the horizontal structure and against the vertical structure by second fastening means.

2. The propulsion assembly according to claim 1, further comprising at least one tank configured to supply said at least one fuel cell with dihydrogen, wherein the at least one tank is fastened beneath the horizontal structure at a rear end thereof.

3. The propulsion assembly according to claim 1, wherein one first fastening means of the first fastening means is fastened between the gearbox and a bottom end of the vertical structure and, on either side of the vertical structure, another first fastening means of the first fastening means is fastened between the gearbox and the horizontal structure.

4. The propulsion assembly according to claim 1, further comprising: lateral fastening points integral with an upper surface of the horizontal structure and configured to fasten the horizontal structure to a structure of a wing of the aircraft, a port rod and a starboard rod, wherein the port rod and the starboard rod are arranged vertically in line with the lateral fastening points, wherein the port rod is fastened between a port end of the horizontal structure at a lower surface of the horizontal structure and a port lateral surface of the vertical structure, and wherein the starboard rod is fastened between a starboard end of the horizontal structure at a lower surface of the horizontal structure and a starboard lateral surface of the vertical structure.

5. The propulsion assembly according to claim 1,
wherein the propulsion assembly has, on either side of the chassis, at least one lateral cowl mounted to be able to move in rotation on the horizontal structure about a pivot axis, and
wherein, for the at least one lateral cowl, the propulsion assembly further comprises hinges, of which a fixed part is integral with the horizontal structure and a mobile part integral with the at least one lateral cowl.

6. The propulsion assembly according to claim 5,
further comprising, on either side of the vertical structure, arches that are distributed along port and starboard edges of the horizontal structure,
wherein each arch has a first end fastened to the port or starboard edge of the horizontal structure and a second end fastened to a bottom end of the vertical structure at a port or starboard lateral surface of the vertical structure.

7. The propulsion assembly according to claim 6,
wherein one arch of said arches is disposed between a first propulsion element and a second propulsion element of said propulsion elements and
wherein a fire break wall is disposed inside said one arch.

8. The propulsion assembly according to claim 5, further comprising an upper cowl fastened to the chassis between a first lateral cowl and a second lateral cowl of the at least one lateral cowl.

9. The propulsion assembly according to claim 1, further comprising a floor fastened at a bottom end of the vertical structure, parallel to the horizontal structure and opposite the horizontal structure with respect to the vertical structure.

10. The propulsion assembly according to claim 1,
further comprising four fastening points, a first pair of the four fastening points is located on a port side and a second pair of the four fastening points is located on a starboard side of the horizontal structure and a first fastening point in the first pair of four fastening points and a first fastening point in the second pair of the four fastening points are positioned in front of a second fastening point in the first pair of the four fastening points and a second fastening point of the second pair of the four fastening points, each fastening point formed as a shackle,
wherein each shackle corresponding to a front fastening point of the four fastening points is mounted in an articulated manner by one front articulation point to the horizontal structure and configured to be mounted in an articulated manner by the one front articulation point to a structure of a wing of the aircraft,
wherein the one front articulation point comprises a rotation about an axis of rotation parallel to the longitudinal direction,
wherein each shackle corresponding to a rear fastening point of the four fastening points is mounted in an articulated manner by two rear articulation points to the horizontal structure and configured to be mounted in an articulated manner by one rear articulation point of the two rear articulation points to the structure of the wing, and
wherein each rear articulation point comprises a rotation about a horizontal axis of rotation having a non-zero angle with the longitudinal direction.

11. An aircraft having at least one propulsion assembly according to claim 1.

* * * * *